US012657190B2

(12) United States Patent
Han et al.

(10) Patent No.: US 12,657,190 B2
(45) Date of Patent: Jun. 16, 2026

(54) DATA QUERY METHOD BASED ON ONLINE ANALYTICAL PROCESSING, MEDIUM, AND DEVICE

(71) Applicant: Beijing Volcano Engine Technology Co., Ltd., Beijing (CN)

(72) Inventors: Yuxing Han, Beijing (CN); Xuan Luo, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/774,869

(22) Filed: Jul. 16, 2024

(65) Prior Publication Data

US 2025/0036624 A1     Jan. 30, 2025

(30) Foreign Application Priority Data

Jul. 25, 2023     (CN) .......................... 202310923100.0

(51) Int. Cl.
| | |
|---|---|
| *G06F 16/2453* | (2019.01) |
| *G06F 16/2452* | (2019.01) |
| *G06F 16/2455* | (2019.01) |
| *G06F 16/28* | (2019.01) |

(52) U.S. Cl.
CPC .. *G06F 16/24544* (2019.01); *G06F 16/24526* (2019.01); *G06F 16/2456* (2019.01); *G06F 16/283* (2019.01)

(58) Field of Classification Search
CPC ......... G06F 16/24544; G06F 16/24526; G06F 16/2456; G06F 16/283
See application file for complete search history.

(56) References Cited

U.S. PATENT DOCUMENTS

| | | | | |
|---|---|---|---|---|
| 6,507,840 B1 * | 1/2003 | Ioannidis | .......... | G06F 16/24526 |
| 6,865,567 B1 * | 3/2005 | Oommen | .......... | G06F 16/24542 |

(Continued)

FOREIGN PATENT DOCUMENTS

| | | | | |
|---|---|---|---|---|
| CN | 110888859 A | | 3/2020 | |
| CN | 110622146 B | * | 7/2022 | ........... G06F 9/5072 |
| CN | 116150189 A | | 5/2023 | |

OTHER PUBLICATIONS

"Factor Graph", https: en.wkipedia.org/wiki/Factor_graph, hereinafter Wikipedia (Year: 2022).*

(Continued)

*Primary Examiner* — Khanh B Pham
*Assistant Examiner* — Kweku William Halm
(74) *Attorney, Agent, or Firm* — BakerHostetler

(57)     ABSTRACT

The present disclosure relates to a data query method and apparatus based on online analytical processing, a medium, and a device. The method includes: obtaining a plurality of target join keys between query tables in a structured query statement in response to reception of the structured query statement; constructing a first factor graph corresponding to the structured query statement based on the plurality of target join keys, where a factor node in the first factor graph is used to represent a conditional probability distribution in the case of presence of the target join keys in a query table corresponding to the factor node; and estimating an upper limit value of a join cardinality of the structured query statement based on the first factor graph.

15 Claims, 2 Drawing Sheets

Obtain a plurality of target join keys between query tables in a structured query statement in response to reception of the structured query statement     S101

Construct a first factor graph corresponding to the structured query statement based on the plurality of target join keys     S102

Estimate an upper limit value of a join cardinality of the structured query statement based on the first factor graph     S103

(56)                    References Cited

U.S. PATENT DOCUMENTS

| | | | | |
|---|---|---|---|---|
| 2011/0060731 | A1* | 3/2011 | Al-Omari | G06F 16/24545 |
| | | | | 707/718 |
| 2016/0055205 | A1 | 2/2016 | Jonathan et al. | |
| 2016/0098471 | A1* | 4/2016 | Weidner | G06F 16/24532 |
| | | | | 707/737 |
| 2020/0192901 | A1* | 6/2020 | Portisch | G06F 16/242 |
| 2022/0092069 | A1* | 3/2022 | Hartsing | G06F 16/24544 |
| 2022/0148016 | A1* | 5/2022 | Fang | G06F 16/2264 |
| 2024/0427768 | A1* | 12/2024 | Kamali | G06F 16/2456 |

OTHER PUBLICATIONS

Cai et al "Pessimistic Cardinality Estimation: Tighter Upper Bounds for Intermediate Join Cardinalities", Cai et al., 2019 (Year: 2019).*
"Cardinality Estimation (SQL Server)"; https://learn.microsoft.com/en-us/sql/relational-databases/performance/cardinality-estimation-sql-server?view=sql-server-ver16; Microsoft; Jan. 8, 2024; accessed Jul. 19, 2024; 13 pages.
"Common connection algorithms for SQL JOIN"; https://zhuanlan.zhihu.com/p/495442432; Apr. 2022; accessed Jul. 23, 2024; 5 pages.
"Factor graph"; https://en.wikipedia.org/wiki/Factor_graph; Wikipedia; accessed Jul. 19, 2024; 3 pages.
Cai et al.; "Pessimistic Cardinality Estimation: Tighter Upper Bounds for Intermediate Join Cardinalities"; SIGMOD; Jun.-Jul. 2019; p. 18-35.
Wu et al.; "BayesCard: Revitalizing Bayesian Networks for Cardinality Estimation"; arXiv:2012.14743; Feb. 2021; 16 pages.
Extended European Search Report for European Application No. 24189579.6, mailed Nov. 28, 2024, 12 pages.
Wu Z., et al., "FactorJoin: A New Cardinality Estimation Framework for Join Queries," Proceedings of the ACM on Management of Data, ACMPUB27, May 2023, vol. 1, No. 1, pp. 1-27.
China Patent Application No. 202310923100.0; Office Action; dated Sep. 17, 2025; 14 pages.

* cited by examiner

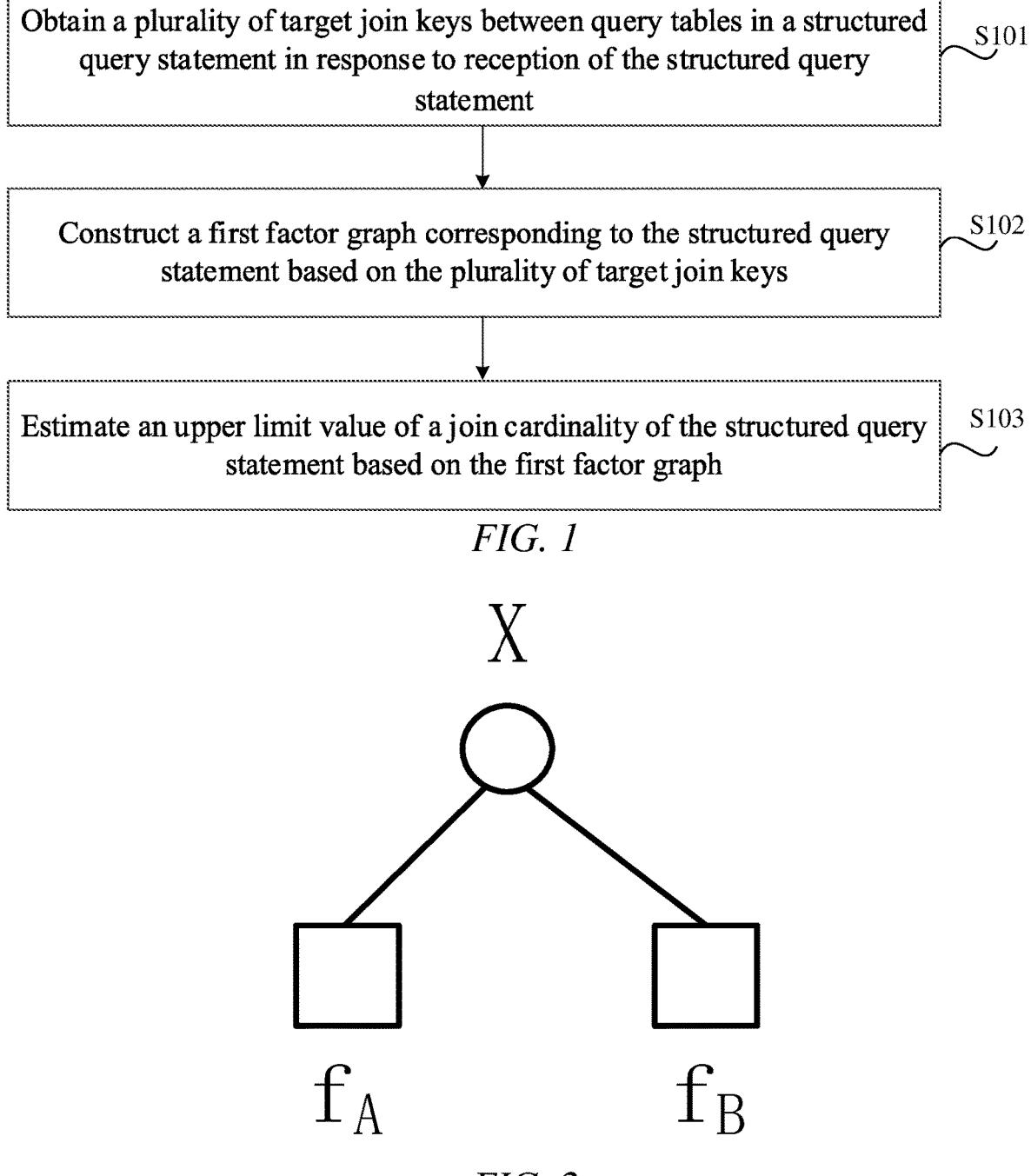

Obtain a plurality of target join keys between query tables in a structured query statement in response to reception of the structured query statement          S101

Construct a first factor graph corresponding to the structured query statement based on the plurality of target join keys          S102

Estimate an upper limit value of a join cardinality of the structured query statement based on the first factor graph          S103

DATA QUERY METHOD BASED ON ONLINE ANALYTICAL PROCESSING, MEDIUM, AND DEVICE

CROSS REFERENCE TO RELATED ART

This application claims the benefit of priority to the Chinese patent application No. 202310923100.0, entitled "DATA QUERY METHOD AND APPARATUS BASED ON ONLINE ANALYTICAL PROCESSING, MEDIUM, AND DEVICE", filed on Jul. 25, 2023, which is hereby incorporated by reference in its entirety into the present application.

TECHNICAL FIELD

The present disclosure relates to the field of data management technologies, and specifically, to a data query method based on online analytical processing, a medium, and a device.

BACKGROUND ART

In a large-scale online analytical processing (OLAP) system, a join is a very important operator in a Structured Query Language (SQL) query processed by the system, and an amount (i.e., an estimated value of a join cardinality) of data to be processed by the system is always one of technical challenges in system query optimization. The estimated value of the join cardinality can help an SQL query optimizer plan a better join order and a join-optimal physical operator.

SUMMARY OF THE INVENTION

The Summary is provided to give a brief overview of concepts, which will be described in detail later in the section Detailed Description of Embodiments. The Summary is neither intended to identify key or necessary features of the claimed technical solutions, nor is it intended to be used to limit the scope of the claimed technical solutions.

According to a first aspect, the present disclosure provides a data query method based on online analytical processing. The method includes:

obtaining a plurality of target join keys between query tables in a structured query statement in response to reception of the structured query statement;

constructing a first factor graph corresponding to the structured query statement based on the plurality of target join keys, where a factor node in the first factor graph is used to represent a conditional probability distribution in the case of presence of the target join keys in a query table corresponding to the factor node; and estimating an upper limit value of a join cardinality of the structured query statement based on the first factor graph.

According to a second aspect, the present disclosure provides a data query apparatus based on online analytical processing. The apparatus includes:

an obtaining module configured to obtain a plurality of target join keys between query tables in a structured query statement in response to reception of the structured query statement;

a construction module configured to construct a first factor graph corresponding to the structured query statement based on the plurality of target join keys, where a factor node in the first factor graph is used to represent a conditional probability distribution in the case of presence of the target join keys in a query table corresponding to the factor node; and an estimation module configured to estimate an upper limit value of a join cardinality of the structured query statement based on the first factor graph.

According to a third aspect, the present disclosure provides a computer-readable medium having a computer program stored thereon, where the program, when executed by a processing apparatus, causes the steps of the data query method based on online analytical processing provided in the first aspect of the present disclosure to be implemented.

According to a fourth aspect, the present disclosure provides an electronic device. The electronic device includes:

a storage apparatus having a computer program stored thereon; and a processing apparatus configured to execute the computer program in the storage apparatus to implement the steps of the data query method based on online analytical processing provided in the first aspect of the present disclosure.

The other features and advantages of the present disclosure will be described in detail in the following section Detailed Description of Embodiments.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the accompanying drawings, the same or similar reference numerals denote the same or similar elements. It should be understood that the accompanying drawings are schematic and that parts and elements are not necessarily drawn to scale. In the accompanying drawings:

FIG. 1 is a flowchart of a data query method based on online analytical processing according to an exemplary embodiment;

FIG. 2 is a schematic diagram of a factor graph according to an exemplary embodiment;

DETAILED DESCRIPTION OF THE INVENTION

Figures 3, 4:
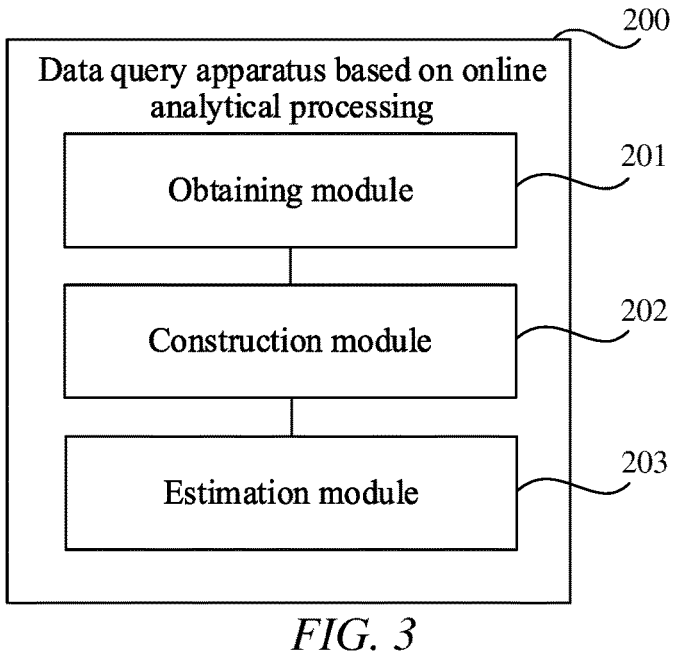
FIG. 3 is a block diagram of a data query apparatus based on online analytical processing according to an exemplary embodiment.
FIG. 4 is a schematic diagram of a structure of an electronic device according to an exemplary embodiment.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

It can be understood that before the use of the technical solutions disclosed in the embodiments of the present disclosure, the user shall be informed of the type, range of use, use scenarios, etc., of personal information involved in the present disclosure in an appropriate manner in accordance with the relevant laws and regulations, and the authorization of the user shall be obtained.

For example, in response to reception of an active request from a user, prompt information is sent to the user to clearly inform the user that the requested operation will require access to and use of personal information of the user. As such, the user can independently choose, based on the prompt information, whether to provide the personal information to software or hardware, such as an electronic device, an application, a server, or a storage medium, that performs the operations of the technical solutions of the present disclosure.

As an optional but non-limiting implementation, in response to the reception of the active request from the user, the prompt information may be sent to the user in the form of, for example, a pop-up window, in which the prompt information may be presented in text. In addition, the pop-up window may also include a selection control for the user to choose whether to "agree" or "disagree" to provide the personal information to the electronic device.

It can be understood that the above process of notifying and obtaining user authorization is only illustrative and does not constitute a limitation on the implementations of the present disclosure, and other manners that satisfy the relevant laws and regulations may also be applied in the implementations of the present disclosure.

Furthermore, it can be understood that the data involved in the technical solutions (including, but not limited to, the data itself and the access to or use of the data) shall comply with the requirements of corresponding laws, regulations, and relevant provisions.

In order to simplify estimation of the join cardinality, a conventional algorithm is typically based on a "join uniformity" assumption, i.e., an assumption that, for two tables that are joined, each row of data in one table has an equal probability of being joined to each row of data in the other table. Under this assumption, the estimated value of the join cardinality may be obtained using statistical information of a single table and probability multiplication. However, due to a complex correlation between real service data, and a generally highly skewed distribution of join key values (that is, distributions of join key values in respective tables are nonuniform), the estimated value of the join cardinality obtained based on the join uniformity assumption usually has low precision.

At present, a cardinality estimation algorithm based on machine learning can better depict a correlation between data of respective columns of a single table, thus performing accurate cardinality estimation in a single-table query. In order to take advantage of high precision of a single-table cardinality estimation model, during multi-table join estimation, an approach of "expanding" a multi-table into single tables, i.e., converting the multi-table into single tables, is employed, followed by solving using the single-table cardinality estimation model. This "expanding" process requires manually introducing an additional column used to indicate a join relationship of the multi-table (e.g., how many rows in one table can be joined to one row in another table). However, a theoretical number of such manually introduced columns for a multi-table join is exponential, causing the number of data columns in the finally expanded virtual "single table" to increase dramatically. As a result, this approach is not suitable for implementation and deployment in real services.

In view of this, the present disclosure provides a data query method and apparatus based on online analytical processing, a medium, and a device.

FIG. 1 is a flowchart of a data query method based on online analytical processing according to an exemplary embodiment. As shown in FIG. 1, the method may include S101 to S103.

In S101, a plurality of target join keys between query tables in a structured query statement are obtained in response to reception of the structured query statement.

In the present disclosure, a join query is a primary query in an OLAP system, where a multi-table query can be implemented through a join operator (e.g., a join). The structured query statement used for the join query is an SQL multi-table join query statement.

For example, the structured query statement is the following SQL statement:

SELECT COUNT (*) FROM A, B WHERE A.id=B.Aid
   AND A.col1>3 AND B.col2 IN [300, 301, 302];
   In SQL, joins are usually classified into four classes: an
   inner join, an outer join, a natural join, and a cross join,
   where the outer join includes a left outer join and a right
   outer join. The structured query statement in the present
   disclosure may be an inner join query statement.

In S102, a first factor graph corresponding to the structured query statement is constructed based on the plurality of target join keys.

In the present disclosure, a factor graph is a common tool in a graphical model (GM) in machine learning, which is generally used to describe a dependency relationship between random variables and plays an important role in an inference algorithm. In the factor graph, the random variables are represented by nodes, and the dependency relationship between the random variables is represented by a factor. The factor is a function that defines a relationship between a set of random variables. The factor may be a probability distribution function or any other function.

The factor graph is an undirected bipartite graph (i.e., bigraph) in which variable nodes and factor nodes are arranged alternately. A variable node represents a random variable, and a factor node represents a factor function. According to characteristics of the bipartite graph, there is an edge only between the variable node and the factor node, and the edge represents a dependency relationship between the variable and the factor. Each factor node is connected to variable nodes that the factor node depends on, indicating that the factor function depends on these variables. The factor graph provides an intuitive way to represent a structure of the probability distribution function, and to make an inference based on values of known variables. A common existing algorithm for the inference in the factor graph is a belief propagation algorithm, which can efficiently calculate a marginal probability distribution of the variable nodes. An outstanding advantage of a factor graph model is that an algebraic manipulation of probability inference can be implemented using a high-efficiency inference algorithm on the factor graph. Accordingly, as long as the problem of modeling the join query using the factor graph is solved, a join cardinality can be conveniently estimated using an existing inference algorithm for the factor graph.

Modeling the join query using the factor graph is constructing the first factor graph corresponding to the structured query statement. In a modeling method, the plurality of target join keys may be classified into one or more equivalence classes (hereinafter referred to as a first target equivalence classes) based on semantic information of each target join key, where semantically identical target join keys belong to the same first target equivalence class, i.e., the semantically identical join keys are classified into the same equivalence class.

For example, the plurality of target join keys include A.id and B.Aid, where A.id and B.Aid are semantically identical. In this case, the plurality of target join keys are classified into one first target equivalence class, i.e., a first target equivalence class "{A.id, B.Aid}".

For another example, the plurality of target join keys include A.id, C.Aid, A.name, and C.name1, where A.id and C.Aid are semantically identical, and A.name and C.name1 are semantically identical. In this case, the plurality of target join keys are classified into two first target equivalence classes, i.e., a first target equivalence class "{A.id, C.Aid}" and a first target equivalence class "{A.name, C.name1}".

For the structured query statement (which may contain a filter condition), one variable node may correspond to one "first target equivalence class" of the structured query statement, and each factor node may correspond to each query table containing a target join key in the structured query statement. That is, a factor node in the first factor graph is in a one-to-one correspondence with a query table to which a target join key in the structured query statement belongs. A factor node and a variable node are joined by an edge therebetween if and only if a "first target equivalence class" corresponding to the variable node contains a target join key in a query table corresponding to the factor node. As such, the factor node in the factor graph can depict a conditional probability distribution in the case of specific join "equivalence columns" (i.e., the query table corresponding to the factor node has its own target join keys in these "equivalence columns"). That is, the factor node in the first factor graph is used to represent a conditional probability distribution in the case of presence of the target join keys in the query table corresponding to the factor node. The equivalence columns are columns where the target join keys in the first target equivalence class are located.

Returning to FIG. 1, in S103, an upper limit value of a join cardinality of the structured query statement is estimated based on the first factor graph.

In the present disclosure, the join cardinality refers to a number of records contained in a new data table generated after a join operation on two data tables. Since underestimation generally has greater impact on query performance than overestimation, the present disclosure chooses to estimate the upper limit value of the join cardinality rather than directly estimating the join cardinality. As such, based on the upper limit value of the join cardinality, query optimization can plan a better join order and help an executor choose a better join computation operator, greatly improving the efficiency and performance of a multi-table join query.

In the above technical solution, a multi-table join query is modeled using the factor graph, where the factor node in the factor graph is used to represent the conditional probability distribution in the case of presence of a target join key in a query table corresponding to the factor node. A conditional probability distribution of a single table may be accurately depicted using an existing high-precision single-table cardinality estimation model, whereby the upper limit value of the join cardinality can be efficiently estimated using the high-precision single-table cardinality estimation model and an existing inference algorithm for the factor graph. Since underestimation generally has greater impact on query performance than overestimation, the present disclosure chooses to estimate the upper limit value of the join cardinality rather than directly estimating the join cardinality. Based on an effective upper limit value of the join cardinality, query optimization can plan a better join order and help an executor choose a better join computation operator, greatly improving the efficiency and performance of the multi-table join query.

A specific implementation of obtaining the plurality of target join keys between the query tables in the structured query statement in S101 above is described below in detail. Specifically, this may be implemented in various manners. In one implementation, a join relationship between the query tables in the structured query statement may be obtained through a table creation statement, where the join relationship includes join keys between the query tables, i.e., the plurality of target join keys.

As a current large-scale OLAP system generally has much lower syntactic requirements for a table schema in table creation than a conventional database system, and does not explicitly state foreign keys of a table, the join relationship between the query tables in the structured query statement sometimes cannot be obtained through the table creation statement. However, a parser built in the current OLAP system may be used to parse historical queries, so as to obtain a join relationship between common data tables in the system (e.g., A.id=B.Aid), and a set of reference equivalence classes is maintained. In other words, semantically identical reference join keys are grouped into one "reference equivalence class", i.e., the semantically identical reference join keys belong to the same reference equivalence class.

For example, the join relationship between the data tables includes A.id=B.Aid and A.id=C.Aid, and A.id, B.Aid, and C.Aid may be grouped into the same reference equivalence class.

As such, the plurality of target join keys between the query tables in the structured query statement may be obtained based on the pre-constructed set of reference equivalence classes in a data query phase. Specifically, in another implementation, the plurality of target join keys between the query tables in the structured query statement may be obtained through step [1] and step [2] below.

Step [1]: Determine at least one second target equivalence class corresponding to the query table in the structured query statement from at least one pre-constructed reference equivalence class.

In the present disclosure, the set of reference equivalence classes includes the at least one reference equivalence class. The reference equivalence class includes reference join keys of the same semantics from different tables.

In one implementation, for each reference equivalence class, a table to which each reference join key in the reference equivalence class belongs may be determined as a target table corresponding to the reference equivalence class. Then, a reference equivalence class corresponding to target tables that include join tables in the structured query statement is determined as a second target equivalence class.

Step [2]: Determine a reference join key belonging to the query table in the structured query statement in each second target equivalence class as a target join key.

For example, the set of reference equivalence classes includes a reference equivalence class "{A.id, B.Aid, C.Aid}" and a reference equivalence class {A.name, C.name1}. In the reference equivalence class "{A.id, B.Aid, C.Aid}", a reference join key A.id is from a table A, a reference join key B.Aid is from a table B, and a reference join key C.Aid is from a table C. Accordingly, target tables corresponding to the reference equivalence class "{A.id, B.Aid, C.Aid}" include the table A, the table B, and the table C. Similarly, target tables corresponding to the reference equivalence class {A.name, C.name1} include the table A and the table C.

When the join tables in the structured query statement include the table A and the table B, the target tables (including the table A, the table B, and the table C) corresponding to the reference equivalence class "{A.id, B.Aid, C.Aid}" include the join tables (i.e., the table A and the table B) in the structured query statement. Therefore, the reference equivalence class "{A.id, B.Aid, C.Aid}" is determined as a second target equivalence class. The join tables in the structured query statement include the table A and the table B. In the second target equivalence class "{A.id, B.Aid, C.Aid}", the reference join key A.id belongs to the table A, and the reference join key B.Aid belongs to the table B. Therefore, A.id and B.Aid may be determined as target join keys.

When the join tables in the structured query statement include the table A and the table C, the target tables (including the table A, the table B, and the table C) corresponding to the reference equivalence class "{A.id, B.Aid, C.Aid}", as well as the target tables (including the table A and the table C) corresponding to the reference equivalence class "{A.name, C.name1}", include the join tables (i.e., the table A and the table C) in the structured query statement. Therefore, the reference equivalence class "{A.id, B.Aid, C.Aid}" and the reference equivalence class "{A.name, C.name1}" are determined as second target equivalence classes. The join tables in the structured query statement include the table A and the table C. In the second target equivalence class "{A.id, B.Aid, C.Aid}", the reference join key A.id belongs to the table A, and the reference join key C.Aid belongs to the table C. Therefore, the A.id and C.Aid may be determined as target join keys. Meanwhile, in the second target equivalence class "{A.name, C.name1}", the reference join key A.name belongs to the table A, and the reference join key C.name1 belongs to the table C. Therefore, the A.name and C.name1 may be determined as target join keys. In other words, the plurality of target join keys between the query tables in the structured query statement include A.id, C.Aid, A.name, and C.name1.

A specific implementation of constructing the first factor graph corresponding to the structured query statement based on the plurality of target join keys in S102 above is described below in detail. Specifically, this may be implemented through step (1) and step (2) below.

Step (1): Construct a respective second factor graph corresponding to each first target equivalence class.

Step (2): Determine each second factor graph as the first factor graph corresponding to the structured query statement.

Specifically, in step (1), the second factor graph corresponding to the first target equivalence class may be constructed through step (11) to step (13) below.

Step (11): Construct, for a query table to which each target join key in the first target equivalence class belongs, a histogram of a current join key in the query table.

In the present disclosure, the current join key in the query table is a target join key belonging to the query table in the first target equivalence class. A range of the histogram is a union of ranges of target join keys in the first target equivalence class. Bucketing methods for histograms of the target join keys in the first target equivalence class are the same. Numbers of buckets created in the histograms of the target join keys in the first target equivalence class are the same.

A histogram represents a distribution of datasets within different value ranges that are generally referred to as buckets. For example, a histogram of weather temperature may illustrate a bar graph, which shows a number of days with temperatures below 30 degrees, between 30 degrees and 35 degrees, and above 35 degrees.

Constructing the histogram of the current join key in the query table is: dividing a data space formed by the union of the ranges of the target join keys in the first target equivalence class into a plurality of subspaces, where one record unit corresponds to one subspace; and collecting, in the record unit, statistics on a number of objects falling within the subspace corresponding to the record unit, where these record units are referred to as buckets, and a set of buckets is referred to as the histogram.

Step (12): Determine a most frequent value of each bucket in the histogram and a conditional probability distribution corresponding to the bucket.

In the present disclosure, the conditional probability distribution corresponding to the bucket indicates a probability that an attribute value of the current join key in the query table falls within the bucket when a query condition is satisfied. The conditional probability distribution corresponding to the bucket may be accurately depicted using the existing high-precision single-table cardinality estimation model, that is, the conditional probability distribution corresponding to the bucket may be determined based on the high-precision single-table cardinality estimation model.

Step (13): Construct the second factor graph corresponding to the first target equivalence class based on each most frequent value and each conditional probability distribution.

In one implementation, a variable node of the second factor graph may be constructed first, where the variable node corresponds to the first target equivalence class. Then, a plurality of factor nodes of the second factor graph are constructed based on each most frequent value and each conditional probability distribution, where the plurality of factor nodes are in a one-to-one correspondence with query tables to which the target join keys in the first target equivalence class belong. Finally, an edge relationship between the variable node and each factor node is constructed to obtain the second factor graph corresponding to the first target equivalence class.

For example, the first target equivalence class is {A.id, B.Aid}, and query tables to which the target join keys in the first target equivalence class {A.id, B.Aid} belong include the table A and the table B. Accordingly, a variable node X corresponding to the first target equivalence class {A.id, B.Aid} is constructed, and at the same time, a factor node $f_A$ and a factor node $f_B$ are constructed, where the factor node $f_A$ corresponds to the table A, and the factor node f corresponds to the table B. Then, an edge relationship between the variable node X and the factor node $f_A$ and an edge relationship between the variable node X and the factor node $f_B$ are constructed. As such, the second factor graph corresponding to the first target equivalence class {A.id, B.Aid} as shown in FIG. 2 may be obtained.

A specific implementation of constructing the plurality of factor nodes of the second factor graph based on each most frequent value and each conditional probability distribution is described below in detail. Specifically, this may be implemented through step (a) and step (b) below.

Step (a): Construct, for the query table to which each target join key in the first target equivalence class belongs, a local function corresponding to the query table based on a most frequent value of each bucket in a current histogram and a conditional probability distribution corresponding to each bucket in the current histogram.

The current histogram is the histogram of the current join key in the query table.

Step (b): Determine the local function corresponding to the query table as a factor node corresponding to the query table in the second factor graph.

For example, the structured query statement is the following statement Q:

SELECT COUNT (*) FROM A, B WHERE A.id=B.Aid
AND A.col1>3 AND B.col2 IN [300, 301, 302];

The SQL statement Q corresponds to the first target equivalence class {A.id, B.Aid}, and the join cardinality J (Q) of the structured query statement is estimated as follows:

$$J(Q) \leq \sum_{i=1}^{k} \left( \min \left( \frac{P(A.id \in bucket_i | Q(A)) * |Q(A)|}{MFV_i(A.id)}, \right. \right.$$
$$\left. \left. \frac{P(B.Aid \in bucket_i) | Q(B) * |Q(B)|}{MFV_i(B.Aid)} \right) * MFV_i(A.id) * MFV_i(B.Aid) \right)$$

where an item on the right of the operator "$\leq$" is the upper limit value of the join cardinality of Q, which may be computed through the factor graph; Q(A)=A.col1>3; Q(B) =B.col2 IN [300, 301, 302]; |Q(A)| is the number of values greater than 3 in a column col1 in the table A; |Q(B)| is the number of col2 falling within [300, 301, 302] in the table B; k is the number of buckets created in the histogram; $bucket_i$ represents an $i^{th}$ bucket; $MFV_i$(A.id) is a most frequent value for the target join key Aid on the $bucket_i$; $MFV_i$(B.Aid) is a most frequent value for the target join key B.Aid on the $bucket_i$; and $P(A.id \in bucket_i | Q(A))$ and $P(B.Aid \in bucket_i)$ |Q(B) may be obtained through the single-table cardinality estimation model.

Accordingly, for the query table A to which the target join key A.id in the first target equivalence class "{A.id, B.Aid}" belongs, a local function $$\frac{P(A.id \in bucket_i | Q(A)) * |Q(A)|}{MFV_i(A.id)}$$

corresponding to the query table A may be constructed based on a most frequent value of each bucket in a histogram of the target join key A.id and a conditional probability distribution corresponding to each bucket in the histogram of the target join key A.id. For the query table B to which the target join key B.Aid in the first target equivalence class "{A.id, B.Aid}" belongs, a local function $$\frac{P(B.Aid \in bucket_i) | Q(B) * |Q(B)|}{MFV_i(B.Aid)}$$

corresponding to the query table B may be constructed based on a most frequent value of each bucket in a histogram of the target join key B.Aid and a conditional probability distribution corresponding to each bucket in the histogram of the target join key B.Aid.

A specific implementation of estimating the upper limit value of the join cardinality of the structured query statement based on the first factor graph in S103 above is described below in detail.

Specifically an upper limit value of a join cardinality corresponding to each first target equivalence class may be estimated based on the second factor graph corresponding to the first target equivalence class. Then, a sum of upper limit values of join cardinalities corresponding to all first target equivalence classes is determined as the upper limit value of the join cardinality of the structured query statement.

After the second factor graph corresponding to the first target equivalence class is constructed, the upper limit value of the join cardinality corresponding to the first target equivalence class may be automatically estimated based on an existing probabilistic inference theory for the second factor graph.

FIG. 3 is a block diagram of a data query apparatus based on online analytical processing according to an exemplary embodiment. As shown in FIG. 3, the apparatus 200 includes:

an obtaining module 201 configured to obtain a plurality of target join keys between query tables in a structured query statement in response to reception of the structured query statement;

a construction module 202 configured to construct a first factor graph corresponding to the structured query statement based on the plurality of target join keys, where a factor node in the first factor graph is used to represent a conditional probability distribution in the case of presence of the target join keys in a query table corresponding to the factor node; and an estimation module 203 configured to estimate an upper limit value of a join cardinality of the structured query statement based on the first factor graph.

In the above technical solution, a multi-table join query is modeled using the factor graph, where the factor node in the factor graph is used to represent the conditional probability distribution in the case of presence of a target join key in a query table corresponding to the factor node. A conditional probability distribution of a single table may be accurately depicted using an existing high-precision single-table cardinality estimation model, whereby the upper limit value of the join cardinality can be efficiently estimated using the high-precision single-table cardinality estimation model and an existing inference algorithm for the factor graph. Since underestimation generally has greater impact on query performance than overestimation, the present disclosure chooses to estimate the upper limit value of the join cardinality rather than directly estimating the join cardinality. Based on an effective upper limit value of the join cardinality, query optimization can plan a better join order and help an executor choose a better join computation operator, greatly improving the efficiency and performance of the multi-table join query.

Optionally, the construction module 202 includes:

a first factor graph construction sub-module configured to construct a respective second factor graph corresponding to each first target equivalence class, where semantically identical target join keys belong to the same first target equivalence class; and a first determining sub-module configured to determine each second factor graph as the first factor graph corresponding to the structured query statement.

Optionally, the first factor graph construction sub-module includes:

a histogram construction sub-module configured to construct, for a query table to which each target join key in the first target equivalence class belongs, a histogram of a current join key in the query table, where the current join key is a target join key belonging to the query table in the first target equivalence class, a range of the histogram is a union of ranges of target join keys in the first target equivalence class, and bucketing methods for histograms of the target join keys in the first target equivalence class are the same; a second determining sub-module configured to determine a most frequent value of each bucket in the histogram and a conditional probability distribution corresponding to the bucket, where the conditional probability distribution corresponding to the bucket indicates a probability that an attribute value of the current join key in the query table falls within the bucket when a query condition is satisfied; and a second factor graph construction sub-module configured to construct the respective second factor graph corresponding to the first target equivalence class based on each most frequent value and each conditional probability distribution.

Optionally, the second factor graph construction sub-module includes:

a variable node construction sub-module construct a variable node of the second factor graph, where the variable node corresponds to the first target equivalence class;

a factor node construction sub-module configured to construct a plurality of factor nodes of the second factor graph based on each most frequent value and each conditional probability distribution, where the plurality of factor nodes are in a one-to-one correspondence with query tables to which the target join keys in the first target equivalence class belong; and an edge relationship construction sub-module configured to construct an edge relationship between the variable node and each factor node to obtain the second factor graph corresponding to the first target equivalence class.

Optionally, the factor node construction sub-module includes:

a local function construction sub-module configured to construct, for the query table to which each target join key in the first target equivalence class belongs, a local function corresponding to the query table based on a most frequent value of each bucket in a current histogram and a conditional probability distribution corresponding to each bucket in the current histogram, where the current histogram is the histogram of the current join key in the query table; and a third determining sub-module configured to determine the local function corresponding to the query table as a factor node corresponding to the query table in the second factor graph.

Optionally, the estimation module 203 includes:

an estimation sub-module configured to estimate an upper limit value of a join cardinality corresponding to each first target equivalence class based on the second factor graph corresponding to the first target equivalence class; and a fourth determining sub-module configured to determine a sum of upper limit values of join cardinalities corresponding to all first target equivalence classes as the upper limit value of the join cardinality of the structured query statement.

Optionally, the obtaining module 202 includes:

a fifth determining sub-module configured to determine at least one second target equivalence class corresponding to the query table from at least one pre-constructed reference equivalence class, where semantically identical reference join keys belong to the same reference equivalence class; and a sixth determining sub-module configured to determine a reference join key belonging to the query table in each second target equivalence class as the target join key.

The present disclosure further provides a computer-readable medium having a computer program stored thereon, where the program, when executed by a processing apparatus, causes the steps of the data query method based on online analytical processing provided in the present disclosure to be implemented.

Referring to FIG. 4 below, there is shown a schematic diagram of a structure of an electronic device (such as a terminal device or a server) 600 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 4 is merely an example, and shall not impose any limitation on the function and scope of use of the embodiments of the present disclosure.

As shown in FIG. 4, the electronic device 600 may include a processing apparatus (e.g., a central processing unit or a graphics processing unit) 601 that may perform a variety of appropriate actions and processing in accordance with a program stored in a read-only memory (ROM) 602 or a program loaded from a storage apparatus 608 into a random-access memory (RAM) 603. The RAM 603 further stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touchscreen, a touchpad, a keyboard, a mouse, a camera, a microphone, an accelerometer, and a gyroscope;

an output apparatus 607 including, for example, a liquid crystal display (LCD), a speaker, and a vibrator; the storage apparatus 608 including, for example, a tape and a hard disk; and a communication apparatus 609. The communication apparatus 609 may allow the electronic device 600 to perform wireless or wired communication with other devices to exchange data. Although FIG. 4 shows the electronic device 600 having various apparatuses, it should be understood that it is not required to implement or have all of the shown apparatuses. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded and installed from a network through the communication apparatus 609, installed from the storage apparatus 608, or installed from the ROM 602. When the computer program is executed by the processing apparatus 601, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) (or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate using any currently known or future-developed network protocol such as a HyperText Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: obtain a plurality of target join keys between query tables in a structured query statement in response to reception of the structured query statement; construct a first factor graph corresponding to the structured query statement based on the plurality of target join keys, where a factor node in the first factor graph is used to represent a conditional probability distribution in the case of presence of the target join keys in a query table corresponding to the factor node; and estimate an upper limit value of a join cardinality of the structured query statement based on the first factor graph.

The computer program code for performing the operations of the present disclosure may be written in one or more programming languages or a combination thereof, where the programming languages include, but are not limited to, an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowchart and the block diagram in the accompanying drawings illustrate the possibly implemented architecture, functions, and operations of the system, method, and computer program product according to the embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules described in the embodiments of the present disclosure may be implemented by software, or may be implemented by hardware. The name of a module does not constitute a limitation on the module itself in some cases. For example, the obtaining module may also be described as "a module for obtaining a plurality of target join keys between query tables in a structured query statement in response to reception of the structured query statement".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

According to one or more embodiments of the present disclosure, Example 1 provides a data query method based on online analytical processing. The method includes:

obtaining a plurality of target join keys between query tables in a structured query statement in response to reception of the structured query statement;

constructing a first factor graph corresponding to the structured query statement based on the plurality of target join keys, where a factor node in the first factor graph is used to represent a conditional probability distribution in the case of presence of the target join keys in a query table corresponding to the factor node; and estimating an upper limit value of a join cardinality of the structured query statement based on the first factor graph.

According to one or more embodiments of the present disclosure, Example 2 provides the method of Example 1, where the constructing a first factor graph corresponding to the structured query statement based on the plurality of target join keys includes:

constructing a respective second factor graph corresponding to each first target equivalence class, where semantically identical target join keys belong to the same first target equivalence class; and determining each second factor graph as the first factor graph corresponding to the structured query statement.

According to one or more embodiments of the present disclosure, Example 3 provides the method of Example 2, where the constructing a respective second factor graph corresponding to each first target equivalence class includes:

constructing, for a query table to which each target join key in the first target equivalence class belongs, a histogram of a current join key in the query table, where the current join key is a target join key belonging to the query table in the first target equivalence class, a range of the histogram is a union of ranges of target join keys in the first target equivalence class, and bucketing methods for histograms of the target join keys in the first target equivalence class are the same; determining a most frequent value of each bucket in the histogram and a conditional probability distribution corresponding to the bucket, where the conditional probability distribution corresponding to the bucket indicates a probability that an attribute value of the current join key in the query table falls within the bucket when a query condition is satisfied; and constructing the second factor graph corresponding to the first target equivalence class based on each most frequent value and each conditional probability distribution.

According to one or more embodiments of the present disclosure, Example 4 provides the method of Example 3, where the constructing the second factor graph corresponding to the first target equivalence class based on each most frequent value and each conditional probability distribution includes:

constructing a variable node of the second factor graph, where the variable node corresponds to the first target equivalence class;

constructing a plurality of factor nodes of the second factor graph based on each most frequent value and each conditional probability distribution, where the plurality of factor nodes are in a one-to-one correspondence with query tables to which the target join keys in the first target equivalence class belong; and constructing an edge relationship between the variable node and each factor node to obtain the second factor graph corresponding to the first target equivalence class.

According to one or more embodiments of the present disclosure, Example 5 provides the method of Example 4, where the constructing a plurality of factor nodes of the second factor graph based on each most frequent value and each conditional probability distribution includes:

constructing, for the query table to which each target join key in the first target equivalence class belongs, a local function corresponding to the query table based on a most frequent value of each bucket in a current histogram and a conditional probability distribution corresponding to each bucket in the current histogram, where the current histogram is the histogram of the current join key in the query table; and determining the local function corresponding to the query table as a factor node corresponding to the query table in the second factor graph.

According to one or more embodiments of the present disclosure, Example 6 provides the method of Example 2, where the estimating an upper limit value of a join cardinality of the structured query statement based on the first factor graph includes:

estimating an upper limit value of a join cardinality corresponding to each first target equivalence class based on the second factor graph corresponding to the first target equivalence class; and determining a sum of upper limit values of join cardinalities corresponding to all first target equivalence classes as the upper limit value of the join cardinality of the structured query statement.

According to one or more embodiments of the present disclosure, Example 7 provides the method of Example 1, where the obtaining a plurality of target join keys between query tables in a structured query statement includes:

determining at least one second target equivalence class corresponding to the query table from at least one pre-constructed reference equivalence class, where semantically identical reference join keys belong to the same reference equivalence class; and determining a reference join key belonging to the query table in each second target equivalence class as the target join key.

According to one or more embodiments of the present disclosure, Example 8 provides a data query apparatus based on online analytical processing. The apparatus includes:

an obtaining module configured to obtain a plurality of target join keys between query tables in a structured query statement in response to reception of the structured query statement;

a construction module configured to construct a first factor graph corresponding to the structured query statement based on the plurality of target join keys, where a factor node in the first factor graph is used to represent a conditional probability distribution in the case of presence of the target join keys in a query table corresponding to the factor node; and an estimation module configured to estimate an upper limit value of a join cardinality of the structured query statement based on the first factor graph.

According to one or more embodiments of the present disclosure, Example 9 provides a computer-readable medium having a computer program stored thereon, where the program, when executed by a processing apparatus, causes the steps of the method according to any one of Examples 1 to 7 to be implemented.

According to one or more embodiments of the present disclosure, Example 10 provides an electronic device. The electronic device includes:

a storage apparatus having a computer program stored thereon; and a processing apparatus configured to execute the computer program in the storage apparatus to implement the steps of the method according to any one of Examples 1 to 7.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims. With respect to the apparatus in the above embodiments, the specific manner in which each module performs an operation has been described in detail in the embodiments relating to the method, and will not be detailed herein.

The invention claimed is:

1. A computer-implemented method of improving efficiency and performance of a multi-table join query in an online analytical processing (OLAP) system, the computer-implemented method comprising:

receiving a Structured Query Language (SQL) statement indicative of the multi-table join query;

determining a plurality of target join keys between query tables indicated in the SQL statement based on a set of reference equivalence classes pre-constructed and maintained in the OLAP system, wherein each reference equivalence class comprises reference join keys of the same semantics from different tables, and wherein the determining the plurality of target join keys between the query tables indicated in the SQL statement comprises:

determining that tables corresponding to at least one reference equivalence class include the query tables indicated in the SQL statement, wherein the at least one reference equivalence class is among the set of reference equivalence classes pre-constructed and maintained in the OLAP system, and determining at least a subset of reference join keys in the at least one reference equivalence class that belongs to the query tables indicated in the SQL statement as the plurality of target join keys, wherein at least a subset of reference join keys in each of the at least one reference equivalence class that belongs to the query tables indicated in the SQL statement constitutes a target equivalence class;

constructing a respective factor graph corresponding to each target equivalence class based on constructing a variable node corresponding to each target equivalence class and constructing a plurality of factor nodes that are in a one-to-one correspondence with query tables to which target join keys in the corresponding target equivalence class belong, wherein semantically identical target join keys belong to a same target equivalence class;

automatically estimating an upper limit value of a join cardinality corresponding to each target equivalence class based on the constructed respective factor graph corresponding to each target factor graph;

computing an upper limit value of a join cardinality of the SQL statement based on the upper limit value of the join cardinality corresponding to each target equivalence class; and implementing the multi-table join query based on the upper limit value of the join cardinality of the SQL statement to improve the efficiency and performance of the multi-table join query in the OLAP system.

2. The method according to claim 1, wherein the constructing a respective factor graph corresponding to each target equivalence class comprises:

constructing, for a query table to which each target join key in a first target equivalence class belongs, a histogram of a current join key in the query table, wherein the current join key is a target join key belonging to the query table in the first target equivalence class, a range of the histogram is a union of ranges of target join keys in the first target equivalence class, and bucketing methods for histograms of the target join keys in the first target equivalence class are the same;

determining a most frequent value of each bucket in the histogram and a conditional probability distribution corresponding to the bucket, wherein the conditional probability distribution corresponding to the bucket indicates a probability that an attribute value of the current join key in the query table falls within the bucket when a query condition is satisfied; and constructing the factor graph corresponding to the first target equivalence class based on each of the most frequent values and each of the conditional probability distributions.

3. The method according to claim 2, wherein the constructing the factor graph corresponding to the first target equivalence class based on each of the most frequent values and each of the conditional probability distributions comprises:

constructing a variable node of the second factor graph, wherein the variable node corresponds to the first target equivalence class;

constructing a plurality of factor nodes of the second factor graph based on each of the most frequent values and each of the conditional probability distributions, wherein the plurality of factor nodes of the second factor graph are in a one-to-one correspondence with query tables to which the target join keys in the first target equivalence class belong; and constructing an edge relationship between the variable node and each of the plurality of factor nodes of the second factor graph to obtain the second factor graph corresponding to the first target equivalence class.

4. The method according to claim 3, wherein the constructing the plurality of factor nodes of the factor graph based on each of the most frequent values and each of the conditional probability distributions comprises:

constructing, for the query table to which each target join key in the first target equivalence class belongs, a local function corresponding to the query table based on a most frequent value of each bucket in a current histogram and a conditional probability distribution corresponding to each bucket in the current histogram, wherein the current histogram is the histogram of the current join key in the query table; and determining the local function corresponding to the query table as a factor node corresponding to the query table in the factor graph.

5. The method according to claim 1, wherein the computing an upper limit value of a join cardinality of the SQL statement based on comprises:

determining a sum of the upper limit values of join cardinalities corresponding to each target equivalence class as the upper limit value of the join cardinality of the SQL statement.

6. A non-transitory computer-readable medium having a computer program stored thereon, wherein the program, when executed by a processing apparatus, causes the processing apparatus to perform operations comprising:

receiving a Structured Query Language (SQL) statement indicative of a multi-table join query;

determining a plurality of target join keys between query tables indicated in the SQL statement based on a set of reference equivalence classes pre-constructed and maintained in an online analytical processing (OLAP) system, wherein each reference equivalence class comprises reference join keys of the same semantics from different tables, and wherein the determining the plurality of target join keys between the query tables indicated in the SQL statement comprises:

determining that tables corresponding to at least one reference equivalence class include the query tables indicated in the SQL statement, wherein the at least one reference equivalence class is among the set of reference equivalence classes pre-constructed and maintained in the OLAP system, and determining at least a subset of reference join keys in the at least one reference equivalence class that belongs to the query tables indicated in the SQL statement as the plurality of target join keys, wherein at least a subset of reference join keys in each of the at least one reference equivalence class that belongs to the query tables indicated in the SQL statement constitutes a target equivalence class;

constructing a respective factor graph corresponding to each target equivalence class based on constructing a variable node corresponding to each target equivalence class and constructing a plurality of factor nodes that are in a one-to-one correspondence with query tables to which target join keys in the corresponding target equivalence class belong, wherein semantically identical target join keys belong to a same target equivalence class;

automatically estimating an upper limit value of a join cardinality corresponding to each target equivalence class based on the constructed respective factor graph corresponding to each target factor graph;

computing an upper limit value of a join cardinality of the SQL statement based on the upper limit value of the join cardinality corresponding to each target equivalence class; and implementing the multi-table join query based on the upper limit value of the join cardinality of the SQL statement to improve efficiency and performance of the multi-table join query in the OLAP system.

7. The non-transitory computer-readable medium according to claim 6, wherein the constructing a respective factor graph corresponding to each target equivalence class comprises:

constructing, for a query table to which each target join key in a first target equivalence class belongs, a histogram of a current join key in the query table, wherein the current join key is a target join key belonging to the query table in the first target equivalence class, a range of the histogram is a union of ranges of target join keys in the first target equivalence class, and bucketing methods for histograms of the target join keys in the first target equivalence class are the same;

determining a most frequent value of each bucket in the histogram and a conditional probability distribution corresponding to the bucket, wherein the conditional probability distribution corresponding to the bucket indicates a probability that an attribute value of the current join key in the query table falls within the bucket when a query condition is satisfied; and constructing the factor graph corresponding to the first target equivalence class based on each of the most frequent values and each of the conditional probability distributions.

8. The non-transitory computer-readable medium according to claim 7, wherein the constructing the factor graph corresponding to the first target equivalence class based on each of the most frequent values and each of the conditional probability distributions comprises:

constructing a variable node of the factor graph, wherein the variable node corresponds to the first target equivalence class;

constructing a plurality of factor nodes of the factor graph based on each of the most frequent values and each of the conditional probability distributions, wherein the plurality of factor nodes of the factor graph are in a one-to-one correspondence with query tables to which the target join keys in the first target equivalence class belong; and constructing an edge relationship between the variable node and each of the plurality of factor nodes of the factor graph to obtain the factor graph corresponding to the first target equivalence class.

9. The non-transitory computer-readable medium according to claim 8, wherein the constructing the plurality of factor nodes of the factor graph based on each of the most frequent values and each of the conditional probability distributions comprises:

constructing, for the query table to which each target join key in the first target equivalence class belongs, a local function corresponding to the query table based on a most frequent value of each bucket in a current histogram and a conditional probability distribution corresponding to each bucket in the current histogram, wherein the current histogram is the histogram of the current join key in the query table; and determining the local function corresponding to the query table as a factor node corresponding to the query table in the factor graph.

10. The non-transitory computer-readable medium according to claim 6, wherein the computing an upper limit value of the join cardinality of the SQL statement based on comprises:

determining a sum of the upper limit values of join cardinalities corresponding to each target equivalence class as the upper limit value of the join cardinality of the SQL statement.

11. An electronic device, comprising:

a storage apparatus having a computer program stored thereon; and a processing apparatus configured to execute the computer program in the storage apparatus to implement operations comprising:

receiving a Structured Query Language (SQL) statement indicative of a multi-table join query;

determining a plurality of target join keys between query tables indicated in the SQL statement based on a set of reference equivalence classes pre-constructed and maintained in an online analytical processing (OLAP) system, wherein each reference equivalence class comprises reference join keys of the same semantics from different tables, and wherein the determining the plurality of target join keys between the query tables indicated in the SQL statement comprises:

determining that tables corresponding to at least one reference equivalence class include the query tables indicated in the SQL statement, wherein the at least one reference equivalence class is among the set of reference equivalence classes pre-constructed and maintained in the OLAP system, and determining at least a subset of reference join keys in the at least one reference equivalence class that belongs to the query tables indicated in the SQL statement as the plurality of target join keys, wherein at least a subset of reference join keys in each of the at least one reference equivalence class that belongs to the query tables indicated in the SQL statement constitutes a target equivalence class;

constructing a respective factor graph corresponding to each target equivalence class based on constructing a variable node corresponding to each target equivalence class and constructing a plurality of factor nodes that are in a one-to-one correspondence with query tables to which target join keys in the corresponding target equivalence class belong, wherein semantically identical target join keys belong to a same target equivalence class;

automatically estimating an upper limit value of a join cardinality corresponding to each target equivalence class based on the constructed respective factor graph corresponding to each target factor graph;

computing an upper limit value of a join cardinality of the SQL statement based on the upper limit value of the join cardinality corresponding to each target equivalence class; and implementing the multi-table join query based on the upper limit value of the join cardinality of the SQL statement to improve efficiency and performance of the multi-table join query in the OLAP system.

12. The electronic device according to claim 11, wherein the constructing a respective factor graph corresponding to each target equivalence class comprises:

constructing, for a query table to which each target join key in a first target equivalence class belongs, a histogram of a current join key in the query table, wherein the current join key is a target join key belonging to the query table in the first target equivalence class, a range of the histogram is a union of ranges of target join keys in the first target equivalence class, and bucketing methods for histograms of the target join keys in the first target equivalence class are the same;

determining a most frequent value of each bucket in the histogram and a conditional probability distribution corresponding to the bucket, wherein the conditional probability distribution corresponding to the bucket indicates a probability that an attribute value of the current join key in the query table falls within the bucket when a query condition is satisfied; and constructing the factor graph corresponding to the first target equivalence class based on each of the most frequent values and each of the conditional probability distributions.

13. The electronic device according to claim 12, wherein the constructing the factor graph corresponding to the first target equivalence class based on each of the most frequent values and each of the conditional probability distributions comprises:

constructing a variable node of the factor graph, wherein the variable node corresponds to the first target equivalence class;

constructing a plurality of factor nodes of the factor graph based on each of the most frequent values and each of the conditional probability distributions, wherein the plurality of factor nodes of the factor graph are in a one-to-one correspondence with query tables to which the target join keys in the first target equivalence class belong; and constructing an edge relationship between the variable node and each of the plurality of factor nodes of the factor graph to obtain the factor graph corresponding to the first target equivalence class.

14. The electronic device according to claim 13, wherein the constructing the plurality of factor nodes of the factor graph based on each of the most frequent values and each of the conditional probability distributions comprises:

constructing, for the query table to which each target join key in the first target equivalence class belongs, a local function corresponding to the query table based on a most frequent value of each bucket in a current histogram and a conditional probability distribution corresponding to each bucket in the current histogram, wherein the current histogram is the histogram of the current join key in the query table; and determining the local function corresponding to the query table as a factor node corresponding to the query table in the factor graph.

15. The electronic device according to claim 11, wherein the computing an upper limit value of the join cardinality of the SQL statement based on comprises:

determining a sum of the upper limit values of join cardinalities corresponding to each target equivalence class as the upper limit value of the join cardinality of the SQL statement.

\* \* \* \* \*